(12) United States Patent
Spiller

(10) Patent No.: US 10,475,472 B2
(45) Date of Patent: Nov. 12, 2019

(54) MAGNETIC HEAD

(71) Applicant: Insurgo Media Services Ltd, Gwent (GB)

(72) Inventor: Roy Spiller, West Glamorgan (GB)

(73) Assignee: Insurgo Media Services Ltd, Gwent (GB)

( * ) Notice: Subject to any disclaimer, the term of this patent is extended or adjusted under 35 U.S.C. 154(b) by 0 days.

(21) Appl. No.: 15/552,269

(22) PCT Filed: Jun. 21, 2017

(86) PCT No.: PCT/GB2017/051824
§ 371 (c)(1),
(2) Date: Aug. 18, 2017

(87) PCT Pub. No.: WO2017/221014
PCT Pub. Date: Dec. 28, 2017

(65) Prior Publication Data
US 2019/0147906 A1      May 16, 2019

(30) Foreign Application Priority Data

Jun. 22, 2016 (GB) .................................. 1610940.7

(51) Int. Cl.
*G11B 15/60* (2006.01)
*G11B 5/008* (2006.01)
(Continued)

(52) U.S. Cl.
CPC .......... *G11B 5/00813* (2013.01); *G11B 5/024* (2013.01); *G11B 5/127* (2013.01); *G11B 5/187* (2013.01); *G11B 5/325* (2013.01)

(58) Field of Classification Search
CPC ......... G11B 5/187; G11B 5/265; G11B 5/024; G11B 5/315; G11B 15/60
(Continued)

(56) References Cited

U.S. PATENT DOCUMENTS

| 3,812,536 | A |   | 5/1974 | Linke |           |
|-----------|---|---|--------|-------|-----------|
| 4,286,295 | A | * | 8/1981 | Ipolyi | ...................... G11B 5/02 |
|           |   |   |        |       | 360/118   |

(Continued)

FOREIGN PATENT DOCUMENTS

| DE | 2045073 A1 | 3/1972 |
| DE | 2261450 A1 | 6/1974 |

(Continued)

OTHER PUBLICATIONS

Plummer, E P, "UK Search Report", prepared for application No. 1610940.7, dated Dec. 13, 2016, 7 pages.

(Continued)

*Primary Examiner* — Nabil Z Hindi
(74) *Attorney, Agent, or Firm* — Winstead PC

(57) ABSTRACT

The present invention provides a magnetic head for erasing data on a magnetic tape, the magnetic head comprising a body having an elongate magnet mounted thereon, and a plurality of magnetisable portions in magnetisable communication with the magnet, the plurality of magnetisable portions being aligned with the elongate magnet and forming at least a portion of a substantially planar external surface of the magnetic head. The present invention further provides a method and system for erasing data on a magnetic tape using said magnetic head.

13 Claims, 5 Drawing Sheets

(51) Int. Cl.
    *G11B 5/024* (2006.01)
    *G11B 5/127* (2006.01)
    *G11B 5/187* (2006.01)
    *G11B 5/325* (2006.01)

(58) Field of Classification Search
    USPC .......................... 360/122, 121, 118, 130.21
    See application file for complete search history.

(56) References Cited

U.S. PATENT DOCUMENTS

| | | |
|---|---|---|
| 4,387,410 A | 6/1983 | Takanohashi et al. |
| 2011/0131140 A1 | 6/2011 | Groel |

FOREIGN PATENT DOCUMENTS

| | | |
|---|---|---|
| JP | S5022614 A | 3/1975 |
| JP | S55122217 | 9/1980 |
| JP | S57111803 A | 7/1982 |
| JP | S5860321 A | 4/1983 |
| JP | S5946432 | 8/1984 |
| JP | S6233316 | 2/1987 |
| JP | H01264612 A | 10/1989 |
| JP | H05325141 A | 12/1993 |
| JP | H07282417 A | 10/1995 |
| JP | 5325410 B2 | 10/2013 |
| JP | 5589913 B2 | 9/2014 |
| SU | 1094054 A | 5/1984 |
| SU | 1661831 A1 | 7/1991 |

OTHER PUBLICATIONS

Rutsch, Gerald, "International Search Report and Written Opinion", prepared for application No. PCT/GB2017/051824, dated Sep. 13, 2017, 10 pages.

* cited by examiner

MAGNETIC HEAD

The present invention relates to a magnetic head for data erasure.

BACKGROUND OF THE INVENTION

Open reel, reel to reel, or 9 track tape as it was referred to many years ago, included 9 physical data/recording tracks on half an inch of tape. Today's tape technology has advanced to provide over a thousand data tracks on the most predominantly used half inch tapes. In addition, the tape includes what is known as a 'servo' track. This is a magnetic frequency strip installed on the full length of each tape and the intention of the servo track is to keep the drive head in line with the data tracks that it is writing to, during use.

Often the data recorded onto tape is confidential in nature and therefore, when this data is no longer required, the tapes cannot simply be discarded as normal waste. In addition, due to data protection requirements and the like, it is more secure to erase the data on the tapes prior to the disposal of the tapes rather than relying on the disposal into landfill as being sufficient to protect the privacy of the data.

To remove already recorded data from a tape, it is necessary to apply a strong magnetic field to the tape—this is known in the industry as 'degaussing'. However, one of the disadvantages of data removal using strong magnetic fields is that it is non-track specific and the servo track is erased along with the recorded data. As the servo track is essential to the functionality of the tape, it renders the tape non-reusable. This presents the expensive situation where every recording operation requires the use of a new tape and tapes cannot be recycled after the erase process has taken place.

However, particularly when an organisation has a large requirement for tapes for data recordal, for example in the financial sector where data recordal is a regulated and required function, the constant need to buy new tapes is very expensive. There is a need for an efficient erasing process that effectively erases previously recorded data without damaging the servo track so that the tapes may be re-used.

The present invention seeks to address the problems of the prior art.

SUMMARY OF THE INVENTION

Accordingly, a first aspect of the present invention provides a magnetic head for erasing data on a magnetic tape, the magnetic head comprising a body having an elongate magnet mounted thereon, and a plurality of magnetisable portions in magnetisable communication with the magnet, the plurality of magnetisable portions being aligned with the elongate magnet and forming at least a portion of a substantially planar external surface of the magnetic head.

The invention utilises a plurality of magnetisable portions to form at least a part of the external surface of the magnetic head over which the magnetic tapes is passed during the erasing process. The use of an elongate magnet to magnetise a plurality of magnetisable portions ensures that a consistent magnetic strength is achieved across the external surface of the head. Individual magnets will have their own specific magnetic strength. Therefore, the use of multiple magnets to create a magnetised external surface over which a magnetic tape is to be passed, results in an external surface which an inconsistent magnetic strength across the head. However, the advantage of magnetically charging a plurality of magnetisable portions is that a consistent magnetic charge is achieved across the magnetic head.

The servo tracks are guided across the magnetic head through the gaps between magnetisable portions. In other words, the whole tape is guided by the drive, such that the tracks are retained in the same position relative to the magnetisable portions throughout the erasing process.

In one embodiment, the magnet is located below the substantially planar surface. This avoids any interference in the consistent magnetic charge across the external surface of the magnetic head from the magnet itself.

Preferably, the body comprises any suitable non-magnetisable material known to the skilled person including, but not restricted to brass. However, the body may comprise any other suitable material known to the skilled person including, but not restricted to, stainless steel.

The magnet is preferably a Neodymium magnet that contacts the soft iron magnetisable portions. The magnetisable portions are made to size and one example of a preferred material for the magnetisable portions is a low carbine steel (EN1A) which transfers 99% of the magnet's strength from base to tip. However, it is to be appreciated that any other suitable magnetic/steel materials may be used to achieve a similar effect. For example, using a stronger magnet and a higher grade of steel would give the same effect strength.

In one embodiment, the magnet comprises a single piece elongate magnet. However, it is to be appreciated that the single magnet and associated plurality of magnetisable portions may be replicated across the magnetic head, each arrangement of magnet and magnetisable portions having a consistent magnetic strength across the surface of the magnetisable portions.

Preferably, the each of the plurality of magnetisable portions are all of similar shape and size. In one embodiment, each of the plurality of magnetisable portions are aligned with one another. Each magnetisable portion may be equidistant from each adjacent magnetisable portion. This increases the consistency of the magnetic field across the magnetic head and the subsequent accuracy of the erasure of data tracks, allowing erasure of data from the tape without damaging the servo track.

Preferably, the plurality of magnetisable portions are embedded in the body to form at least a portion of the planar surface with the body. This allows the surface of the magnetisable portions to be positioned flush with the surface of the body, thereby providing a smooth, consistent surface over which to pass the tape in use. This will not only facilitate efficient erasure of data from the tape, but will also prevent snagging of (and potential damage to) the tape as it passes over the magnetic head. Further, it also prevents the undesirable wear and tear on the magnetisable portions that would be experienced if the magnetisable portions were layered onto the surface of the magnetic head.

The magnetic head may further comprise a longitudinal ceramic edge portion located adjacent the plurality of aligned magnetisable portions. In a further embodiment, a ceramic edge portion is located along each longitudinal edge of the aligned plurality of magnetisable portions. The ceramic edge portion(s) protect the external surface of the magnetic head over which the tape is passed in use, thereby preventing erosion of the edge of the magnetic head in use i.e. thereby preventing erosion of the material of the body and/or the magnetisable portions. Any such erosion, and the subsequent change in profile of the magnetic head, will potentially affect the consistency of the magnetic field across the magnetic head and the corresponding efficiency and accuracy of erasure of date from the tape.

A second aspect of the present invention provides a method of erasing data on a magnetic tape, the method comprising the steps of:

a. providing a magnetic head according to a first aspect of the present invention; and b. passing a tape past the substantially planar external surface of the magnetic head.

A third aspect of the present invention provides a system for erasing data on a magnetic tape, the system comprising:

a. a magnetic head according to a first aspect of the present invention;

b. a tape locating means for releasable holding a tape;

c. a drive means for driving the tape past the magnetic head, adjacent the substantially planar external surface thereof.

BRIEF DESCRIPTION OF THE DRAWINGS

An embodiment of the present invention will now be described, by way of example only, and with reference to the accompanying drawings, in which.

DETAILED DESCRIPTION OF THE PREFERRED EMBODIMENTS

Figure 1:
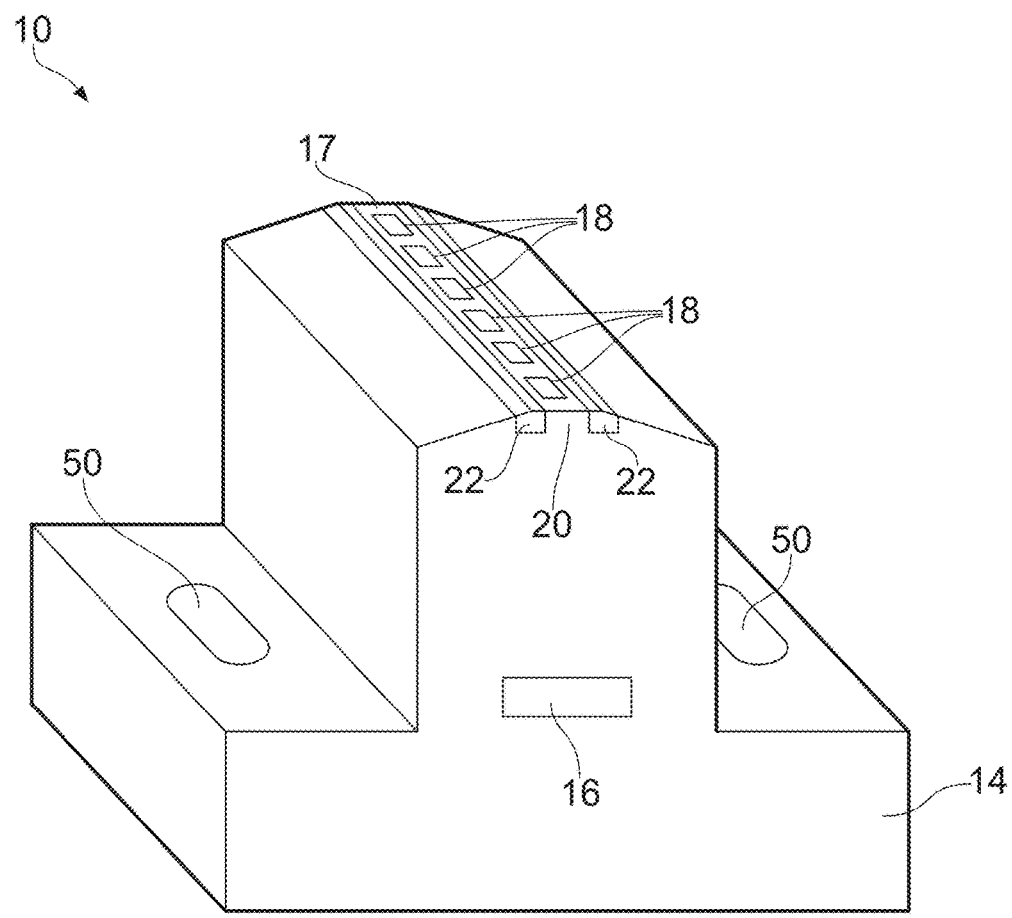
FIG. 1 is a perspective view of an embodiment of a magnetic head in accordance with a first aspect of the present invention.
Figure 2:
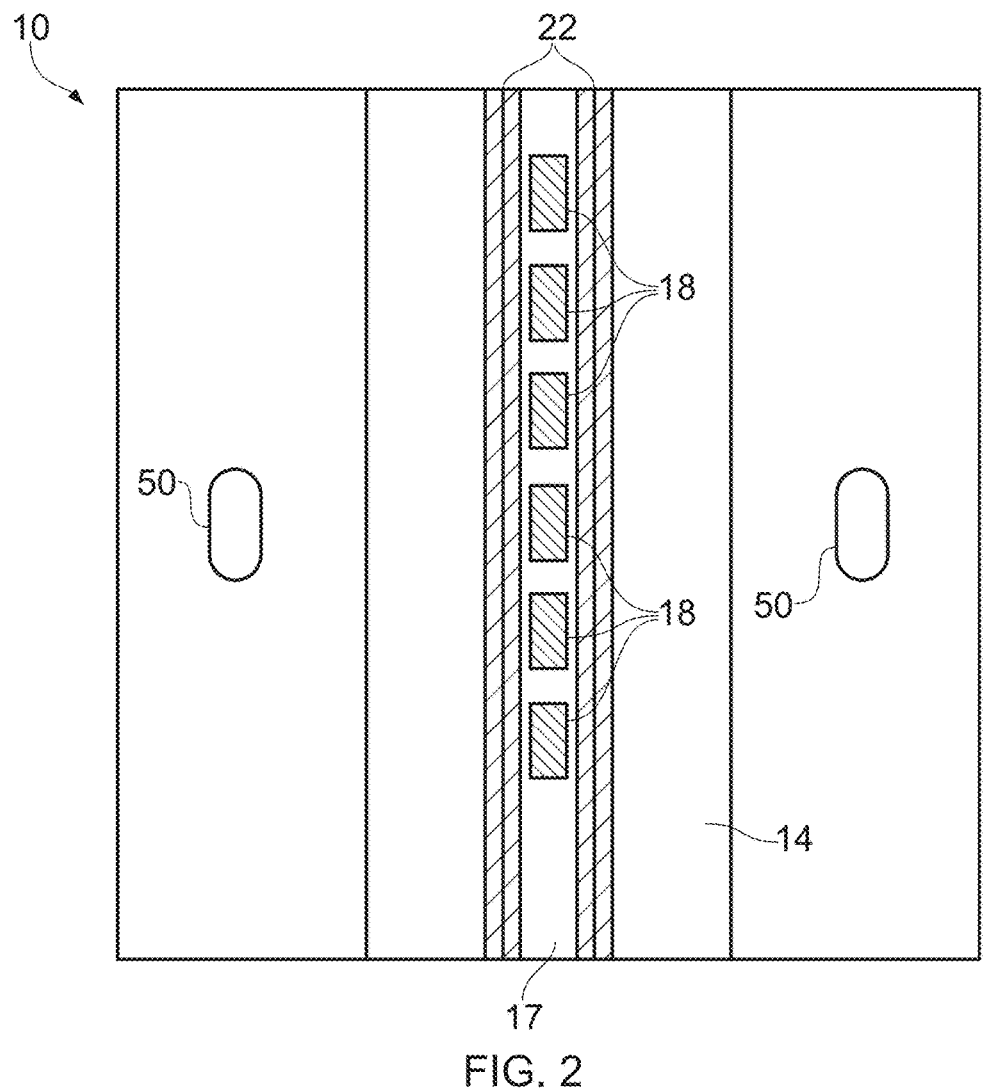
FIG. 2 is a view from above of the magnetic head of FIG. 1.

An embodiment of the present invention will now be described with reference to the figures, in which common features are indicated using common figure references.

FIGS. 1 to 3b show a magnetic head 10 for erasing data on a magnetic tape 12, the magnetic head 10 comprising a body 14 and a magnet 16 mounted on the body and located beneath a plurality of magnetisable portions 18. As can be seen from the figures, the magnet 16 is elongate in form and the plurality of magnetisable portions 18 are aligned with one another and located above the elongate magnet 16. The magnetisable portions 18 are embedded in a brass bed 20 that extends the length of the magnet 16 located below, to form a planar surface 17 over which the tape 12 is passed during the erasing process.

Mounting holes 50 are provided to allow the magnetic head 10 to be mounted in position.

The spacing between adjacent magnetisable portions 18 is important as it allows the erasing process to be accurate enough to erase data from tape 12 without erasure of the important servo tracks.

A ceramic edging 22 is provided on either side of the brass bed 20 and extends along the length of the brass bed 20.

In the embodiment shown, the magnet comprises Neodymium. However, it is to be appreciated that alternative magnetic materials may be used instead such as, but not limited to, soft iron.

In the embodiment shown, the body 14 and the bed 20 comprises brass, which is a non-magnetisable material so will not interfere with the magnetic field across the magnetic head 10, during use.

Figure 3A:
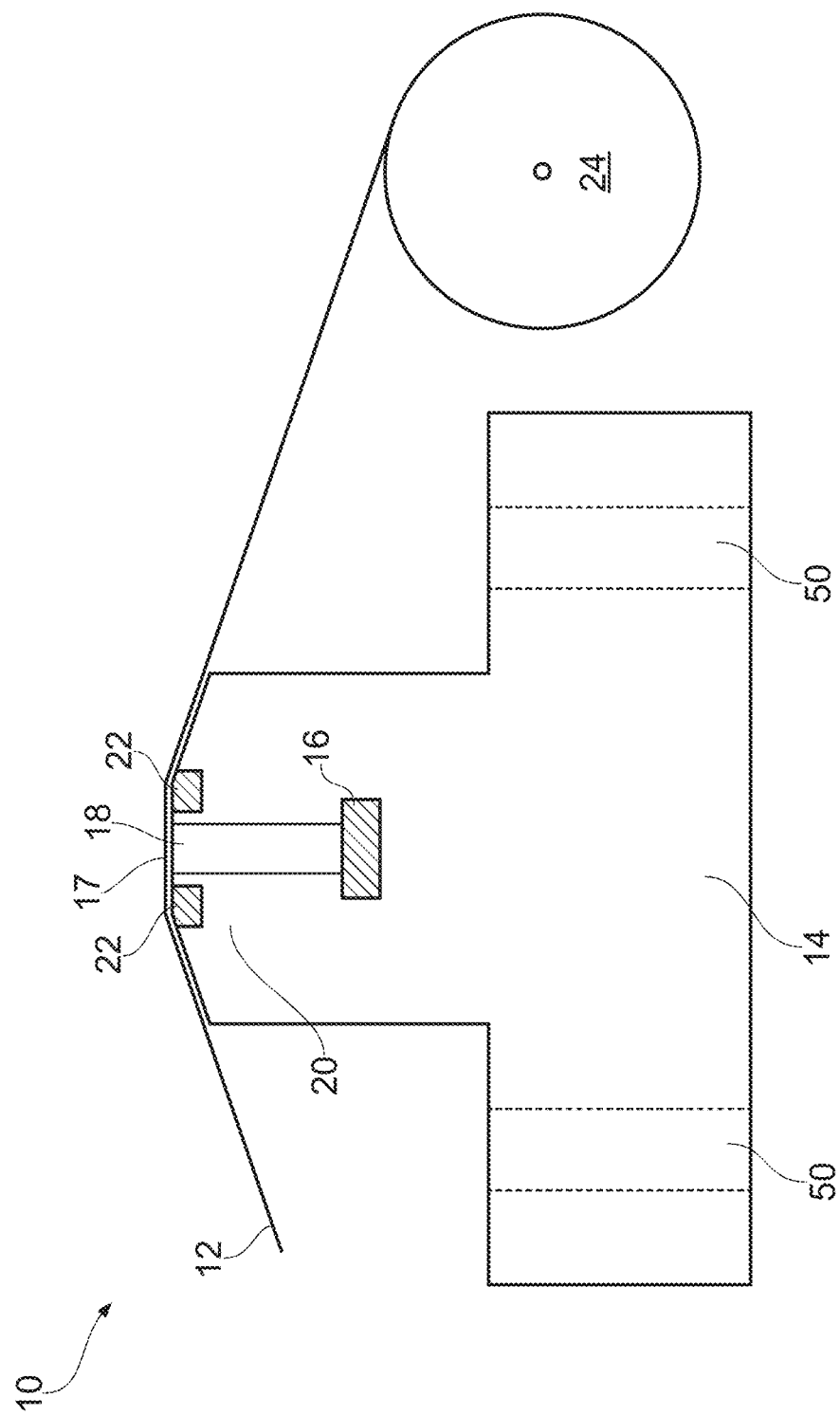
FIG. 3a is a side view of the magnetic head of FIG. 1.
Figure 3B:
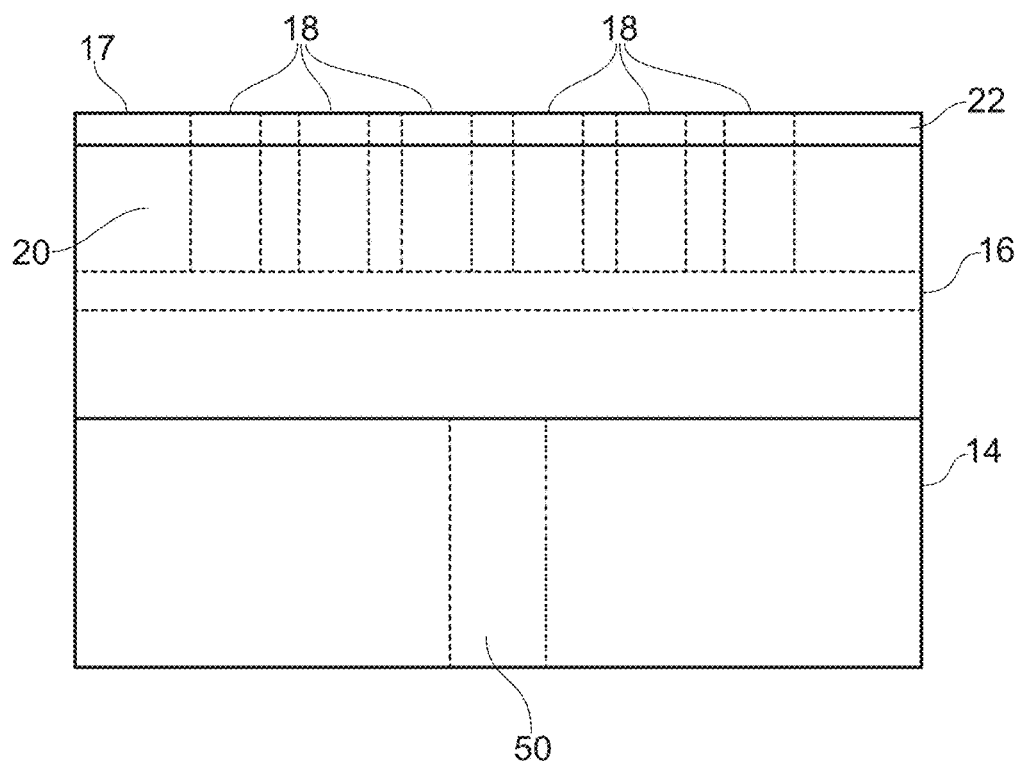
FIG. 3b is front view of the magnetic head of FIG. 1.

FIG. 3A shows the magnetic tape 12 passing over the magnetic head 10, with the direction of travel of the tape shown indicated by arrow A. The tape 12 is driven over the magnetic head 10 by tape drive 24.

The ceramic edging 22 is provided along each longitudinal edge of the brass bed 20 to protect the edge of the erasing surface 17 i.e. the brass bed 20 from erosion by the tape 14 passing across the edge of the erasing surface 17 over time during the erasing process. Omitting the ceramic edging results in a worn profile on the edge of brass bed 20. This altered profile can affect the consistency and strength of the magnetic field across the erasing surface 17 and a consequential loss of accuracy and reliability of data erasure from tape 14.

In use, a tape 14 is engaged with tape drive 24. Tape drive 24 is operated to drive tape 14 over the aligned magnetisable portions 18 of erasing surface 17. As there is a single magnet 16 magnetically charging the aligned magnetisable portions 18, there is a consistent magnetic field strength across erasing surface 17. Accurate passing of tape 14 over magnetisable portions 18 ensures that accurate and complete erasure of date from tape 14 is achieved.

During the erasure process, one single head of approximately 2.5 cm in width is sufficient to erase the data on a standard tape of half an inch in width. However, it is to be appreciated and alternative head widths and tape width combinations may be contemplated.

Figure 4A:
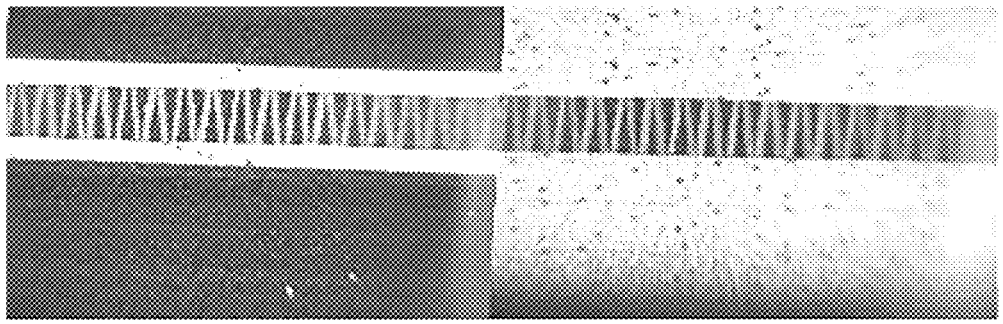
FIGS. 4A and 4B illustrate data band analysis achieved by using the embodiment of FIG. 1 compared with the results achieve using a leading prior art magnetic erase head.
Figure 4B:
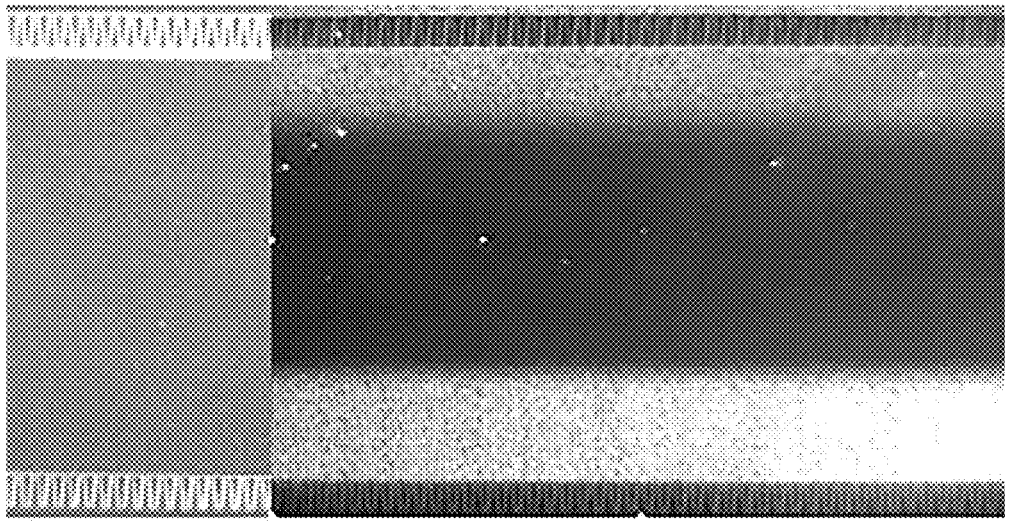

FIGS. 4A and 4B show the results of tape erasing events using the erase head of the present invention compared with using a leading prior art erase head. As can be clearly seen, when using the erase head of the present invention, the data tracks 100 are more efficiently erased without damage to the servo tracks 110. By contrast, the tapes erased using a prior art erase head still contain a significant level of data 100 on each side of the servo tracks 110. Thus, the arrangement of the present invention provides a significant improvement over the prior art.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. A magnetic head for erasing data on a magnetic tape, the magnetic head comprising a body having an elongate magnet located therein, the elongate magnet defining a first axis and a plurality of discrete magnetisable portions in magnetisable communication with the magnet, the plurality of magnetisable portions being aligned with the elongate magnet and forming at least a portion of a substantially planar external surface of the magnetic head, wherein the first axis extends parallel to the substantially planar external surface.

2. A magnetic head as claimed in claim 1, wherein the magnet is located below the substantially planar surface.

3. A magnetic head as claimed in claim 1, wherein the body comprises a non-magnetisable material.

4. A magnetic head according to claim 1, comprising a single piece elongate magnet.

5. A magnetic head according to claim 1, wherein the plurality of magnetisable portions are all of similar shape and size.

6. A magnetic head according to claim 1, wherein the plurality of magnetisable portions are aligned with one another.

7. A magnetic head according to claim 1, wherein each magnetisable portion is equidistant from each adjacent magnetisable portion.

8. A magnetic head according to claim 1, wherein the plurality of magnetisable portions are embedded in the body to form at least a portion of the planar surface with the body.

9. A magnetic head according to claim 1, further comprising a longitudinal ceramic edge portion located adjacent the plurality of aligned magnetisable portions.

10. A magnetic head according to claim 1, wherein a ceramic edge portion is located along each longitudinal edge of the aligned plurality of magnetisable portions.

11. A magnetic head according to claim 1, wherein the magnetisable portions comprise a steel material.

12. A method of erasing data on a magnetic tape, the method comprising the steps of:
   a. providing a magnetic head as claimed in claim 1; and
   b. passing a tape past the substantially planar external surface of the magnetic head.

13. A system for erasing data on a magnetic tape, the system comprising:
   a. a magnetic head as claimed in claim 1;
   b. a tape locating means for releasable holding a tape;
   c. a drive means for driving the tape past the magnetic head, adjacent the substantially planar external surface thereof.

* * * * *